(12) United States Patent
Sueyoshi

(10) Patent No.: US 7,295,380 B2
(45) Date of Patent: Nov. 13, 2007

(54) ZOOM LENS AND IMAGING DEVICE

(75) Inventor: Masafumi Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/558,064

(22) PCT Filed: May 28, 2004

(86) PCT No.: PCT/JP2004/007784

§ 371 (c)(1),
(2), (4) Date: Aug. 15, 2006

(87) PCT Pub. No.: WO2004/107010

PCT Pub. Date: Dec. 9, 2004

(65) Prior Publication Data

US 2006/0274426 A1    Dec. 7, 2006

(30) Foreign Application Priority Data

May 30, 2003   (JP)   .............................. 2003-154758

(51) Int. Cl.
*G02B 15/14* (2006.01)
*H04N 5/262* (2006.01)
(52) U.S. Cl. ...................... 359/684; 359/676; 359/683; 348/240.99
(58) Field of Classification Search ........... 348/240.99; 359/676, 683, 384, 684; 396/72
See application file for complete search history.

(56) References Cited

U.S. PATENT DOCUMENTS 5,694,252 A    12/1997   Yahagi

| 6,169,578 | B1 | 1/2001 | Chigira |
| 6,754,446 | B2 * | 6/2004 | Hagimori et al. .............. 396/72 |
| 7,110,186 | B2 * | 9/2006 | Sueyoshi ..................... 359/676 |
| 2002/0060855 | A1 | 5/2002 | Ohashi |
| 2005/0007678 | A1 | 1/2005 | Sueyoshi |
| 2005/0275948 | A1 * | 12/2005 | Sueyoshi ..................... 359/676 |

FOREIGN PATENT DOCUMENTS

JP    6-27376    2/1994

(Continued)

*Primary Examiner*—David N. Spector
(74) *Attorney, Agent, or Firm*—Oblon, Spivak, McClelland, Maier & Neustadt, P.C.

(57) ABSTRACT

A zoom lens of rear focus type in which a total lens system is able to be miniaturized by further miniaturizing a prism, without deteriorating an optical performance. The zoom lens has a first lens group (GR1) to a fifth lens group (GR5) having refraction powers of a positive, negative, positive, positive and negative from the object side in this order, respectively, and is configured to carry out a zooming operation by moving the second lens group (GR2) and the fourth lens group (GR4). In addition, the first lens group has a front-side lens group having an negative refracting power, an optical element for folding an optical path, and a backside lens group having a positive refracting power, from the object side in this order, and further a condition of $1.3 < \beta 5 < 2.2$ is satisfied, provided that an imaging magnification of the fifth lens group (GR5) at where an object distance is at infinity is $\beta 5$. Therefore, the focal length of the lens groups positioned closer to the object is shortened and an effective diameter of the first lens group (GR1) can be made small, whereby it is possible to make the optical element (for example, prism P1) thinner.

9 Claims, 12 Drawing Sheets

FOREIGN PATENT DOCUMENTS

| | | |
|---|---|---|
| JP | 2000-131610 | 5/2000 |
| JP | 2000-227551 | 8/2000 |
| JP | 2002-156581 | 5/2002 |
| JP | 2003-29146 | 1/2003 |
| JP | 2003-43354 | 2/2003 |
| JP | 2003-107310 | 4/2003 |
| JP | 2003-202500 | 7/2003 |
| JP | 2004-170707 | 6/2004 |

* cited by examiner

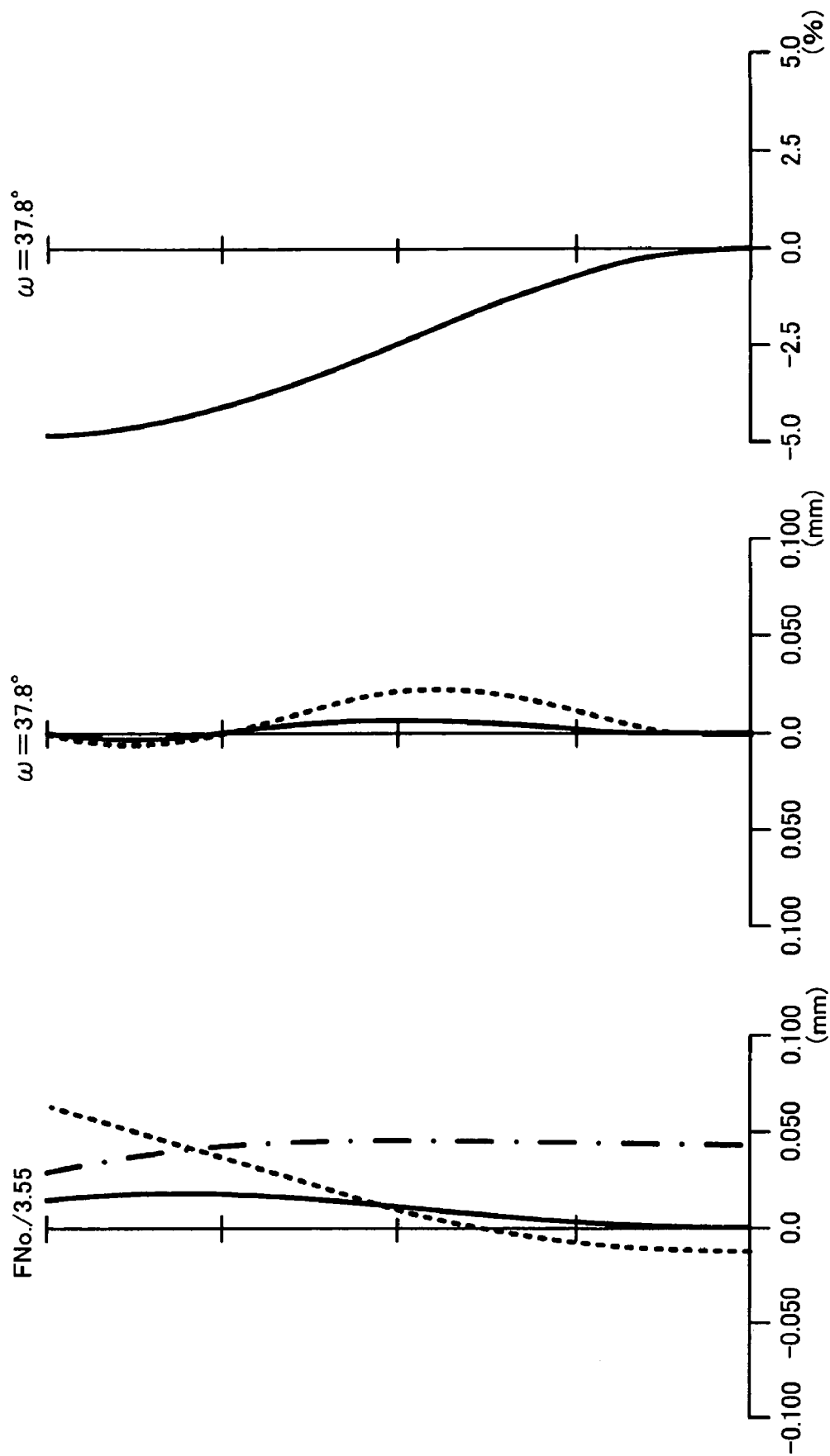

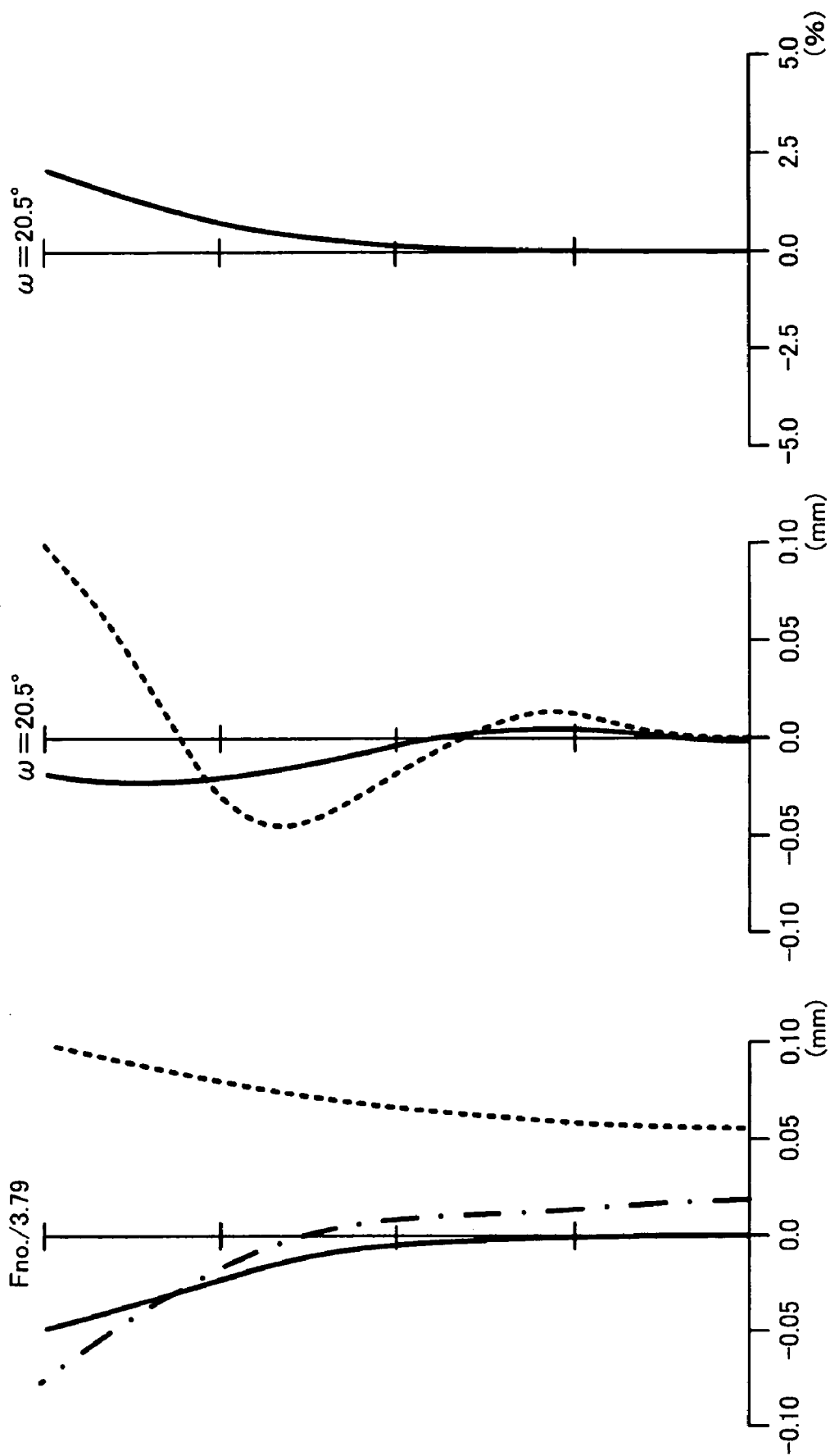

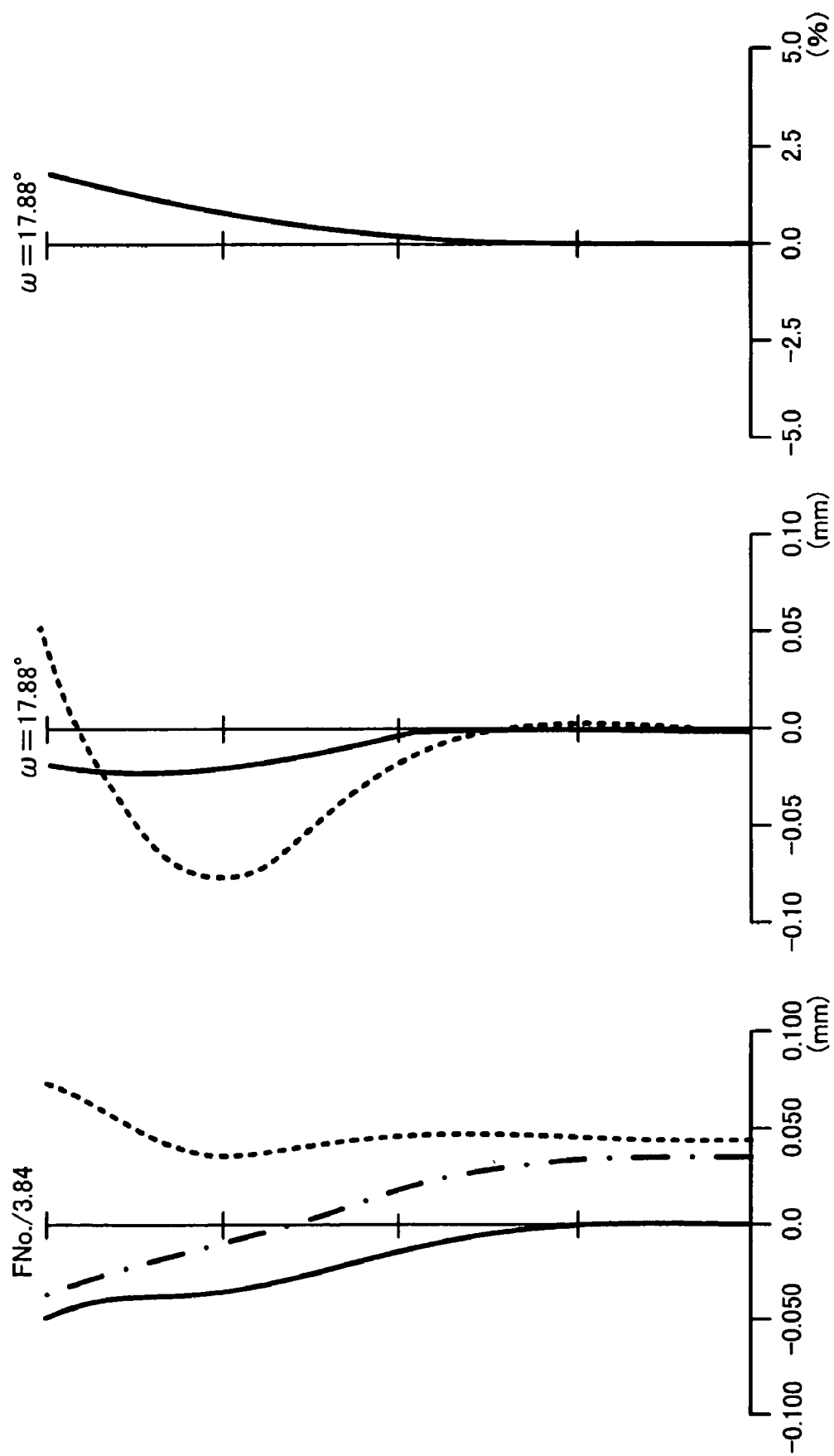

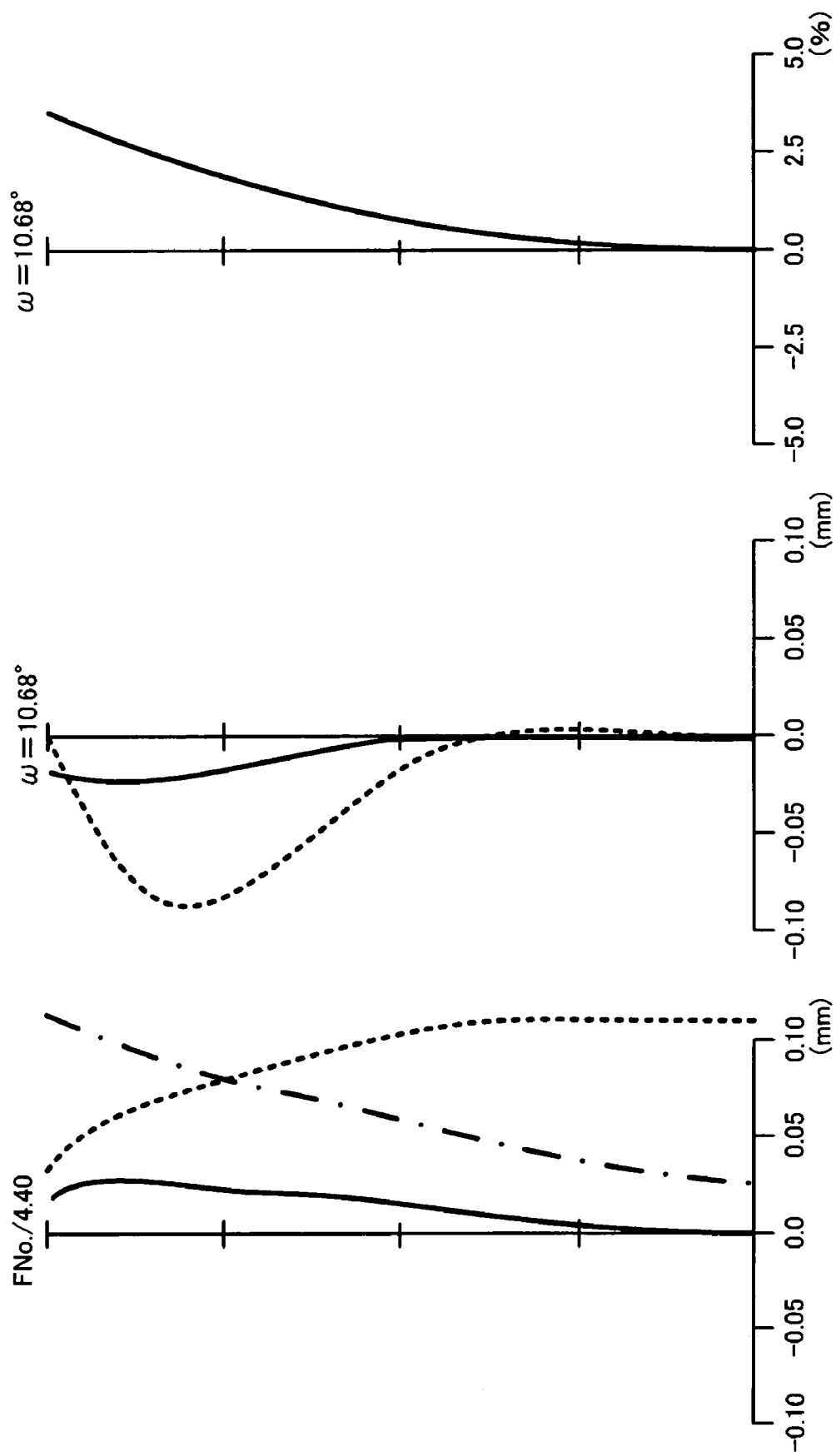

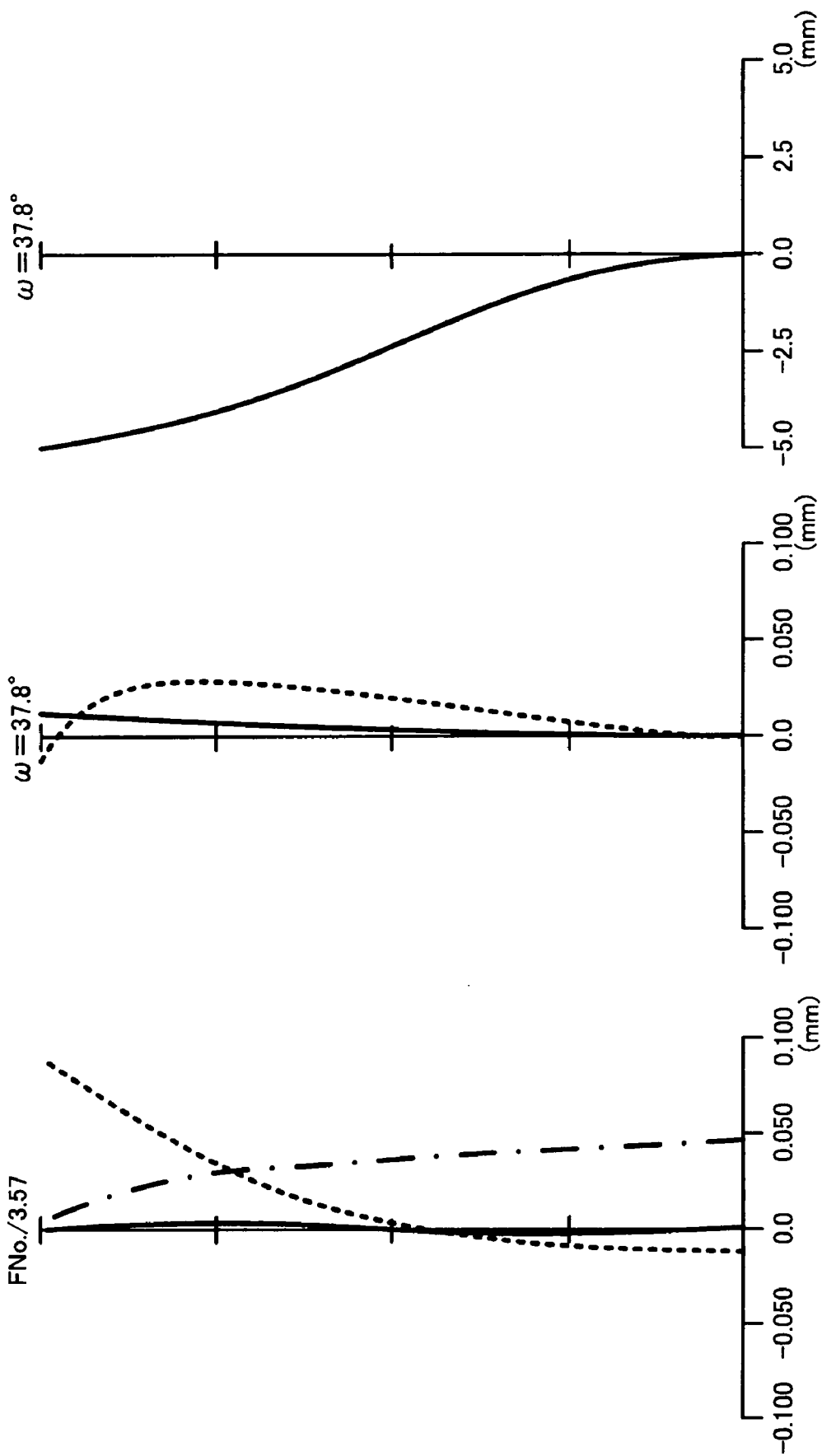

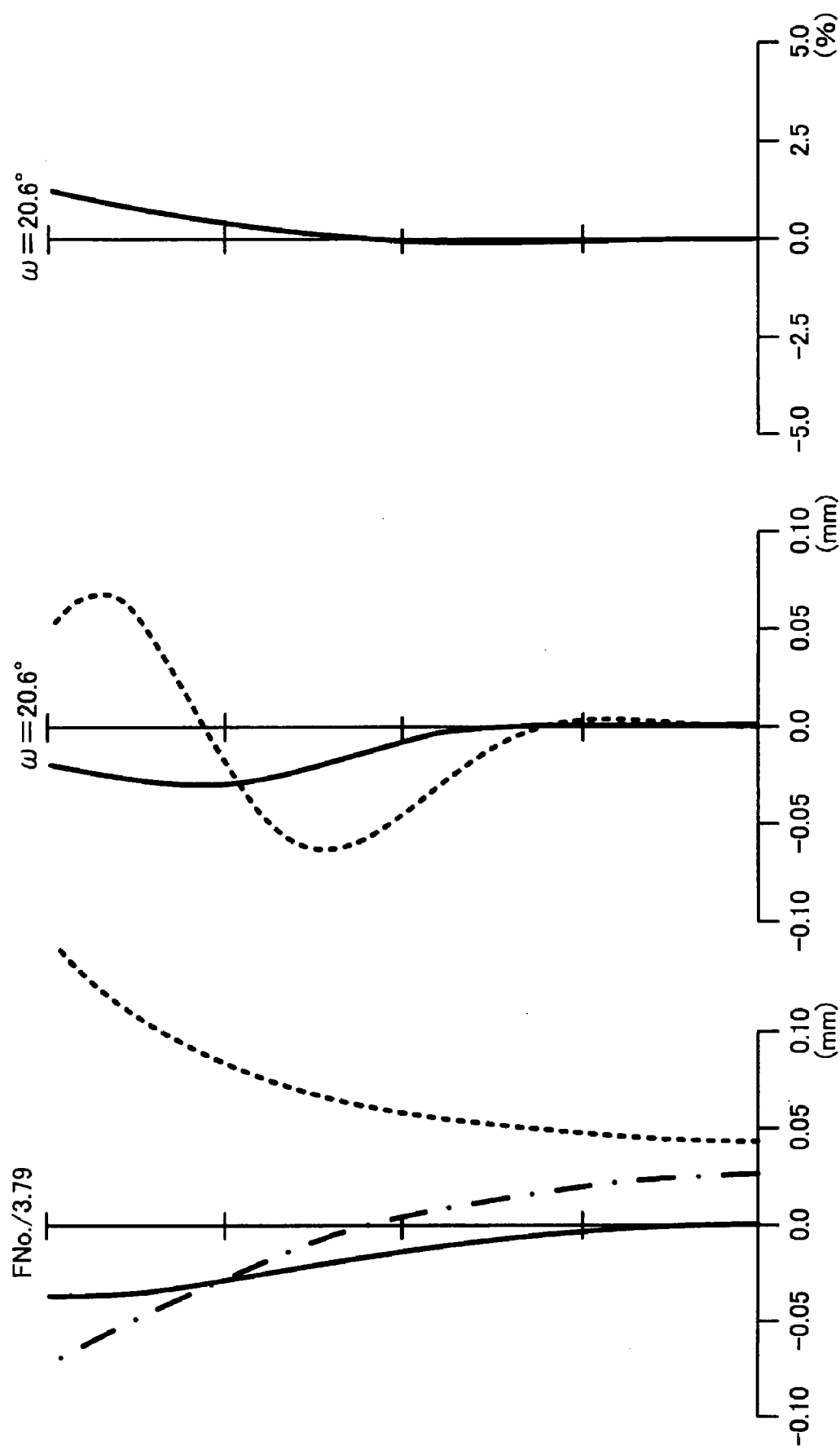

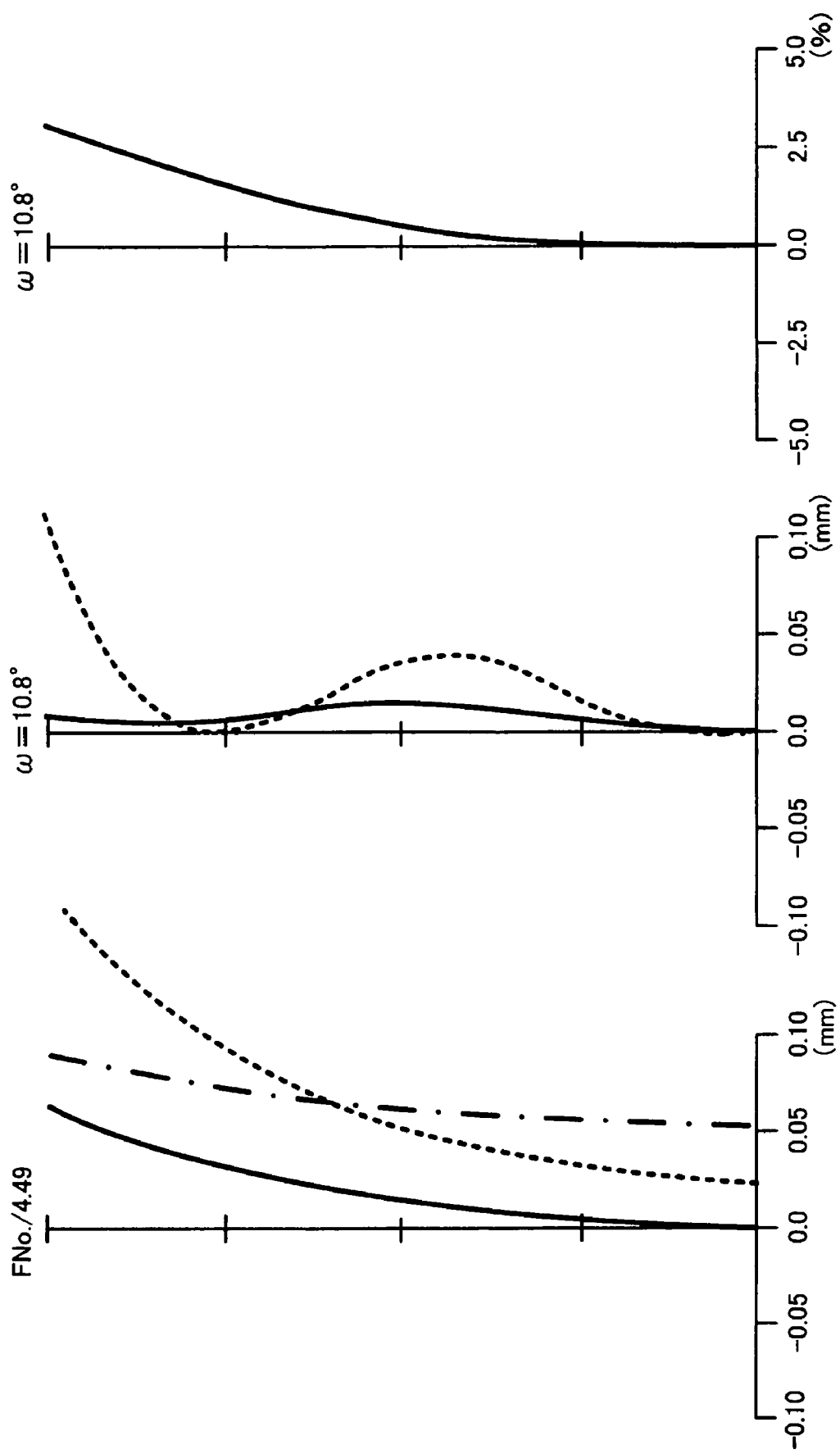

ZOOM LENS AND IMAGING DEVICE

TECHNICAL FIELD

This invention relates to a zoom lens, and an imaging apparatus using this zoom lens as an image-taking lens, and particularly to a zoom lens of rear focus type suitable for a small-sized imaging apparatus such as a digital still camera, a home use video camera, and the like, and also capable of performing a zoom factor of 3 to 5 times, and to an imaging apparatus using such zoom lens.

BACKGROUND ART

In recent years, a digital still camera and a digital video camera have widely spread as home use apparatuses, and further a miniaturized design has been required to those small-sized imaging apparatuses. On this account, an image-taking lens to be mounted, particularly a zoom lens is required to be miniaturized by shortening its total length and horizontal depth. Further, an improvement in the lens performance is also required for such image-taking lens for a digital still camera in response to an increase of the number of pixels in such imaging device in addition to the miniaturized design.

It has been known, for example, that a so-called rear focus type zoom lens, where lens groups other than a first lens group provided at the most object side are moved to focus, is made possible to easily miniaturize a total lens system, and to obtain an imaging performance suitable for a solid-state imaging device having a larger number of pixels. As such zoom lens of rear focus type, a zoom lens having five lens groups is well known, wherein the zoom lens is configured to have a first lens group having a positive refracting power, a second lens group having a negative refracting power, a third lens group having a positive refracting power, a fourth lens group having a positive refracting power, and a fifth lens group having a negative refracting power, from object side in this order, and a zooming operation is carried out by moving the second and fourth lens groups, and a focusing operation is carried out by moving the fourth lens group. For example, there is a zoom lens configured as above which satisfies following equations (1) to (3), wherein focal lengths of the third lens group and the fifth lens group are f3, and f5, an imaging magnification of the fifth lens group at a position where an object distance is at infinity is β5, a focal length of the second lens group is f2, and focal lengths in this total system at a wide-end and a tele-end are fw, and ft, respectively (for example, refer to Japanese Patent Publication No. 3015192 (paragraph number [0014] to [0037], FIG. 1)).

$$0.8 < |f5/f3| < 2.1 \quad (1)$$

$$1.2 < |\beta 5| < 1.6 \quad (2)$$

$$0.25 < |f2/\sqrt{fw \cdot ft}| < 0.37 \quad (3)$$

Recently, it has been considered to delete a projected portion of lens system during taking images by folding an optical path in the middle from the first lens group to an image plane to shorten the length of the lens when assembled in the imaging apparatus, and by setting a movable direction of the lens during zooming operation in the up and down directions. For example, there is a zoom lens that has a first lens group having a positive refracting power, a second lens group having an negative refracting power, a third lens group having a positive refracting power, and a fourth lens group having a positive refracting power, from an object side in this order. The zoom lens is configured to include a lens construction having four lens groups that performs a zooming operation by moving the second and fourth lens groups, wherein the first lens group includes a first lens of a single lens having an negative refracting power, a prism for folding an optical path, and a second lens of a single lens having a positive refracting power, from the object side in this order (for example, refer to Japanese Patent Application Publication No. 2000-131610 (paragraph number [0010] to [0027], FIG. 1)).

In the mean time, in the zoom lens having the optical system where the optical path is folded by a prism, it is possible to realize further miniaturization and a slim model design by miniaturizing a size of the prism. However in the zoom lens disclosed in Japanese Patent Application Publication No. 2000-131610, there is a problem that if a diameter and a thickness of lenses included in the first lens group is made small, it is difficult to further miniaturize the prism because of the deterioration of the optical performance.

This invention is presented in consideration of above-mentioned problem, and it is an object of the present invention to propose a zoom lens of rear focus type in which a total lens system is able to be miniaturized by further miniaturizing the prism without deteriorating an optical performance.

Further, another object of the present invention is to propose an imaging apparatus employing a zoom lens of rear focus type in which a total lens system is able to be miniaturized by further miniaturizing the prism without deteriorating an optical performance.

SUMMARY OF THE INVENTION

According to the present invention, in order to solve the above problems, it is provided a zoom lens characterized by including: from an object side in this order, a first lens group having a positive refracting power, a second lens group having an negative refracting power, a third lens group having a positive refracting power, a fourth lens group having a positive refracting power, and a fifth lens group having a negative refracting power, wherein a zooming operation is carried out by moving the second lens group and the fourth lens group. The first lens group includes a front-side lens group having an negative refracting power, an optical element for folding an optical path, and a backside lens group having a positive refracting power, from the object side in this order, and wherein a condition of $1.3 < \beta 5 < 2.2$ is satisfied, provided that an imaging magnification of the fifth lens group at a position where an object distance is at infinity is $\beta 5$.

The zoom lens as described above includes five lens groups having a positive, negative, positive, positive, and a negative refracting power from an object side in this order, and can perform the zooming operation by moving the second and fourth lens groups. The first lens group includes a front-side lens group having an negative refracting power, an optical element for folding the optical path and a backside lens group having a positive refracting power from the object side, and the movable directions of the second and the fourth lens groups during zooming operation becomes an optical axis direction of the backside lens group of the first lens group, so that the lens system can be made thinner. In addition, by increasing the imaging magnification β5 of the fifth lens group larger than 1.3 where an object distance is at infinity, it is possible to shorten the focal length of the lens groups positioned relatively closer to the object side, and is possible not only to shorten the total length of the lens system but also to make smaller an effective diameter of the front-side lens group and backside lens group of the first lens group. However, if the imaging magnification β5 of the fifth lens group is increased larger than 2.2, an adequate correction for the spherical aberration becomes difficult when the F-number is made smaller, and the imaging performance to the image plane becomes worse.

BRIEF DESCRIPTION OF THE DRAWINGS

FIGS. 2A to 2C are various aberration charts at a short focal length end in a first embodiment;

FIGS. 3A to 3C are various aberration charts at an intermediate focal length in the first embodiment;

FIGS. 6A to 6C are various aberration charts at an intermediate focal length in the second embodiment;

FIGS. 7A to 7C are various aberration charts at a long focal length end in the second embodiment;

FIGS. 8A to 8C are various aberration charts at a short focal length end in a third embodiment;

FIGS. 9A to 9C are various aberration charts at an intermediate focal length in the third embodiment;

FIGS. 10A to 10C are various aberration charts at a long focal length end in the third embodiment;

DETAILED DESCRIPTION OF THE PREFERRED EMBODIMENTS

In following, one embodiment of the present invention is described with reference to the attached drawings.

Figure 1:
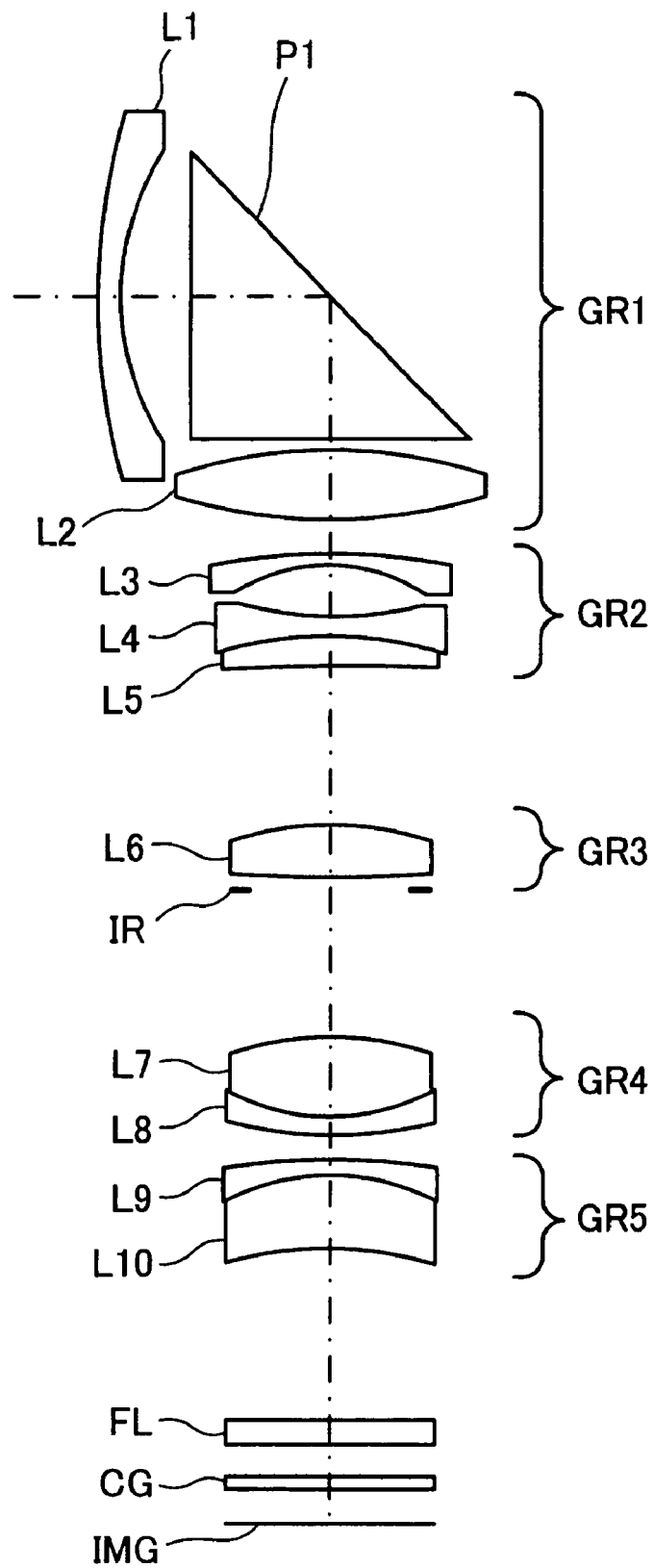
FIG. 1 is a sectional view showing a configuration example of a zoom lens according to one embodiment of the present invention.
Figures 4A, 4B, 4C:
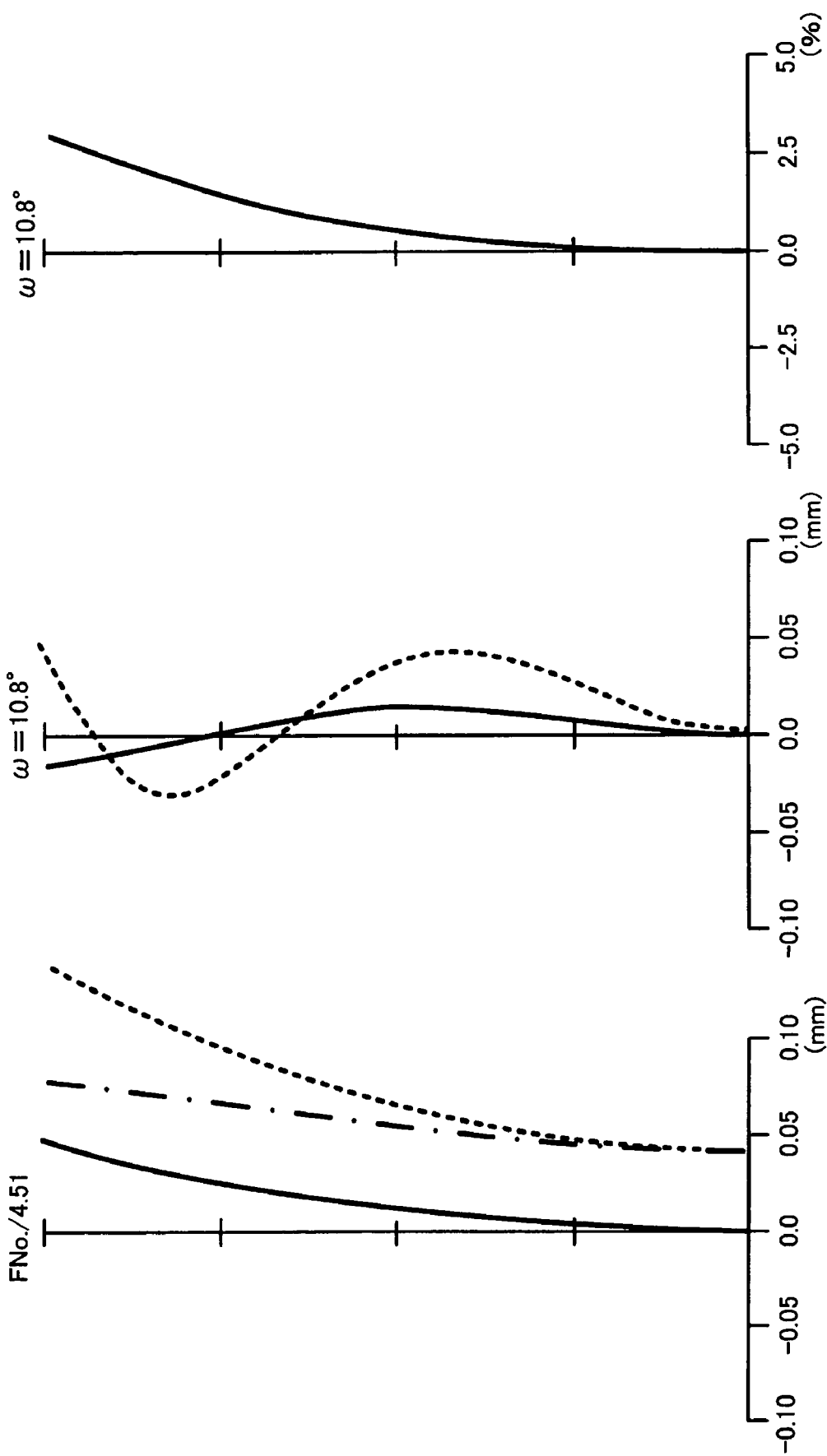
FIGS. 4A to 4C are various aberration charts at a long focal length end in the first embodiment.
Figures 5A, 5B, 5C:
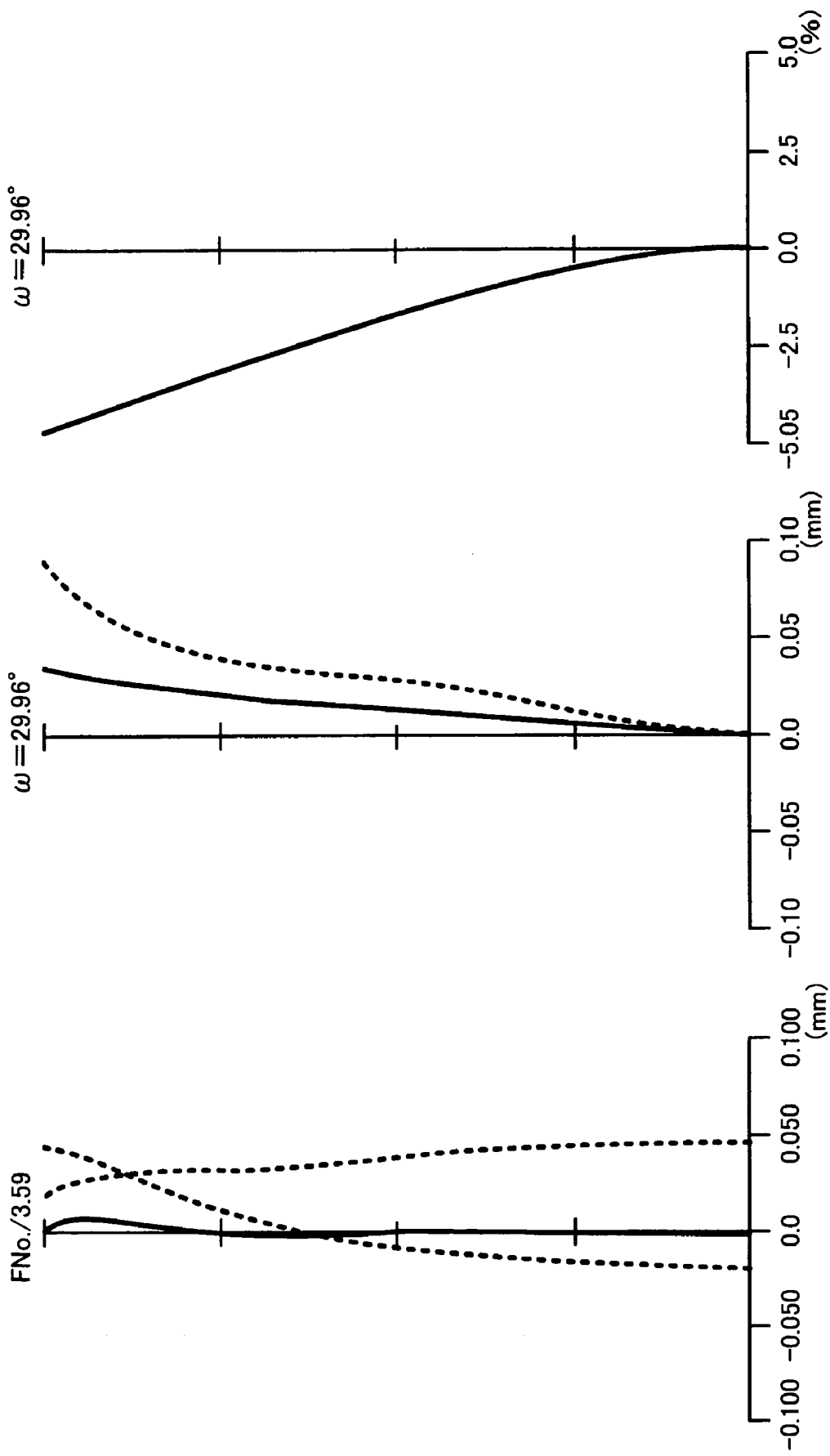
FIGS. 5A to 5C are various aberration charts at a short focal length end in a second embodiment.

FIG. 1 is a sectional view showing a configuration example of a zoom lens according to one embodiment of the present invention.

FIG. 1 shows a configuration example of a zoom lens used as an image-taking lens of an imaging apparatus such as a digital still camera and the like. In this zoom lens, a first lens group GR1 having a positive refracting power, a second lens group GR2 having an negative refracting power, a third lens group GR3 having a positive refracting power, a fourth lens group GR4 having a positive refracting power, and a fifth lens group GR5 having an negative refracting power are provided from an object side to an image plane IMG side in this order. Further, at the image plane IMG side of the third lens group GR3, an iris IR for adjusting an amount of light is disposed, and further at the image plane IMG side of the fifth lens group GR5, a filter FL including a low pass filter such as an infrared cut filter and the like is disposed, and a cover glass CG of an imaging device is provided. The image plane IMG becomes a light receiving surface of an imaging device such as a CCD (Charge Coupled Device), and the like.

This zoom lens is configured to carry out the zooming operation by moving the second lens group GR2 and the fourth lens group GR4. If the zooming operation is performed from the short focal length end to the long focal length end, the second lens group GR2 is moved from the object side to the image plane IMG side, and the fourth lens group GR4 is moved from the image plane IMG side to the object side, respectively. Further, this zoom lens employs a so-called rear focus type, and is possible to carry out the focusing operation by moving either fourth lens group GR4 or fifth lens group GR5.

Further the first lens group GR1 has a single lens L1 having a negative refracting power, a prism P1 for folding an optical path, and a single lens L2 having a positive refracting power, from the object side in this order. Accordingly, a movable direction of lens during the zooming and the focusing operations is made to be an optical axis direction of the lens L2 different from the optical axis direction of the lens L1 at the most object side. In the present embodiment, the lens L1 is configured to be a meniscus lens having a convex surface toward the object side, and both surfaces of the lens L2 are configured to be convex surfaces.

Further, the second lens group GR2 is configured with three pieces of lens L3, lens L4, and lens L5 form the object side in this order, and among them, lens surfaces between the lens L4 and the lens L5 are cemented. Further, the third lens group GR3 is configured with a single lens L6. Further, the fourth lens group GR4 is configured with 2 pieces of lens L7 and lens L8, and lens surfaces between the lens L7 and the lens L8 are cemented. Further, the fifth lens group GR5 is configured with 2 pieces of lens L9 and lens L10, and lens surfaces between the lens L9 and the lens L10 are cemented.

Here, a brief summary of the present invention is described with reference to FIG. 1.

As shown in FIG. 1, the zoom lens of the present invention is configured to have a five-lens-group construction in which the first lens group GR1 to the fifth lens group GR5 having refracting powers of positive, negative, positive, positive and negative, respectively, are provided from an object side in this order, and to perform a zooming operation by moving the second lens group GR2 and the fourth lens group GR4 fourth lens. Further, the first lens group GR1 has a front-side lens group having a negative refracting power, an optical element for folding an optical path, and a backside lens group having a positive refracting power from the object side in this order. The movable direction of lens during zooming and focusing operations becomes to be an optical axis direction of the backside lens group by constructing the first lens group GR1 as described above, so that it is possible to shorten the depth of the lens system, and to always make the horizontal depth constant during its zooming operation and focusing operation, or regardless of on/off of the power.

Further in the embodiment, a single lens L1 and a single lens L2 are provided as a front-side lens group and a backside lens group of the first lens group GR1, respectively, and a prism P1 is provided as an optical element for folding an optical path.

Further, the zoom lens of the present invention is configured to satisfy a following equation (4).

$$1.3 < \beta 5 < 2.2 \quad (4)$$

Provided that the imaging magnification of the fifth lens group GR5 is β5 when a distance to an object is infinite. The equation (4) defines that the imaging magnification β5 is to be higher compared with a related art. In a case where the lens system is designed for the imaging power β5 to be above the lower limit value, it is possible to shorten the focal length of the lenses which are positioned more object side.

Thereby, it is able to shorten the total length of the lens system, and to make smaller the effective diameter of the lens in the first lens group GR1. Along with this, the optical element for folding an optical path (the prism P1 in FIG. 1) is able to be miniaturized, so that the horizontal depth of the lens system can be further shortened.

On the contrary, if the imaging magnification β5 becomes below the lower limit value of the equation (4), it becomes difficult to make small the effective diameter of particularly the front-side lens group (the lens L1 in FIG. 1) in the first lens group GR1. Further, if the imaging magnification β5 becomes above the upper limit value of the equation (4), it becomes impossible to adequately correct the spherical aberration when designed so as to make small the F-number, and further an exit pupil becomes close to the image plane IMG and an angle of an light incident on the imaging device is largely apart from perpendicularity, so shading and the like is generated and the imaging performance is deteriorated.

In this case, the zoom lens of the present invention is configured to satisfy with the above conditions, so that the movable direction of the moving each lens group is able to be determined to one direction during zooming from the short focal length end to the long focal length end. Specifically, the zooming operation from the short focal length end to the long focal length end is able to be carried out by moving the second lens group GR2 from the object side to the image plane IMG side and also by moving the fourth lens group GR4 from the image plane IMG side to the object side.

If such lens drive is carried out during the zooming operation, it is preferable that the second lens group GR2 and the fourth lens group GR4 are configured so that each stroke thereof satisfies with conditions defined by a following equation (5).

$$0.85 < |dZ2/dZ4| < 2.2 \tag{5}$$

In this case, the stroke of the second lens group GR2 from the short focal length end to the long focal length end is dZ2, and the stroke of the fourth lens group GR4 at a position where the object distance is at infinity from the short focal length end to the long focal length end is dZ4. In this case, if it becomes below a lower limit value of the above mentioned equation (5), it becomes necessary to enlarge the effective diameter of the fourth lens group GR4, and the thickness of the total lens system increases. Further, if it becomes above an upper limit value of the equation (5), it becomes necessary to enlarge effective diameters of the first lens group GR1 and the second lens group GR2, and the thickness of the total lens system increases in a similar way.

In addition, as described above, the first lens group GR1 includes the front-side lens group having an negative refracting power, the optical element for folding an optical path, and the backside lens group having a positive refracting power, and it is possible to make the effective diameter of the lens L1 small and to further miniaturize the prism P1 by configuring the lens L1 with a meniscus lens having a convex shape towards the object side, and both lens surfaces of the lens L2 to be convex shapes. In such configuration, the lens L1 is preferable to be configured to satisfy with the following equations (6) and (7).

$$neL1 > 1.8 \tag{6}$$

$$veL1 < 30 \tag{7}$$

In this case, the refraction index of the lens L1 to the e-line is neL1, and the Abbe's number based on the e-line of the lens L1 is veL1. In this case, it becomes possible to easily carry out the spherical aberration correction in the first lens group GR1 by satisfying with the condition of the equation (6). In addition, it becomes possible to easily carry out the chromatic aberration correction in the first lens group GR1 by satisfying with the condition of the equation (7).

Next, specific numerical example of the zoom lens having the construction as shown in FIG. 1 is described. Each numeric value of the first embodiment is shown in Table 1. Further, Table 2 shows each value of a focal length f, an F-number, and a half field angle ω at each focal point in the first embodiment. Further, Table 3 shows an aspheric surface coefficient of a surface configured with an aspheric surface in the first embodiment.

TABLE 1

| | SURFACE NO. | R | d | ne | ve |
|---|---|---|---|---|---|
| L1 | S1 | 29.14 | 0.65 | 1.93323 | 20.7 |
| | S2 | 10.463 | 3.2 | | |
| P1 | S3 | Infinity | 12.0 | 1.83962 | 42.8 |
| | S4 | Infinity | 0.2 | | |
| L2 | S5 | 21.082(ASP) | 2.649 | 1.77173 | 49.0 |
| | S6 | −24.326(ASP) | 0.5 | | |
| | | | to 6.69 | | |
| | | | to 10.558 | | |
| L3 | S7 | 22.873 | 0.5 | 1.83962 | 42.8 |
| | S8 | 7.596 | 1.449 | | |
| L4 | S9 | −13.821 | 0.45 | 1.83962 | 42.8 |
| L5 | S10 | 8.852 | 1.203 | 1.93323 | 20.7 |
| | S11 | 54.65 | 10.558 | | |
| | | | to 4.368 | | |
| | | | to 0.5 | | |
| L6 | S12 | 14.364(ASP) | 1.347 | 1.81081 | 40.5 |
| | S13 | −248.6 | 1.0 | | |
| IR | S14 | — | 9.548 | — | — |
| | | | to 6.388 | | |
| | | | to 2.460 | | |
| L7 | S15 | 13.282(ASP) | 2.489 | 1.58547 | 59.2 |
| L8 | S16 | −6.731 | 0.6 | 1.83701 | 22.2 |
| | S17 | −12.108 | 1.0 | | |
| | | | to 4.160 | | |
| | | | to 8.088 | | |
| L9 | S18 | 12.211 | 0.5 | 1.87004 | 33.5 |
| L10 | S19 | 4.75 | 2.81 | 1.48914 | 70.2 |
| | S20 | 17.634 | 6.688 | | |
| FL | S21 | Infinity | 1.0 | 1.51872 | 64.0 |
| | S22 | Infinity | 1.12 | | |
| CG | S23 | Infinity | 0.5 | 1.51872 | 64.0 |
| | S24 | Infinity | 0.99 | | |
| — | IMG | Infinity | — | — | — |

TABLE 2

| | SHORT FOCAL LENGTH END | INTERMEDIATE FOCAL LENGTH | LONG FOCAL LENGTH END |
|---|---|---|---|
| f | 5.15 | 9.99 | 19.36 |
| FNo. | 3.55 | 3.79 | 4.51 |
| ω | 37.77° | 20.48° | 10.77° |

TABLE 3

| SURFACE NO. | k | C4 | C6 | C8 | C10 |
|---|---|---|---|---|---|
| S5  | 0 | −0.889034E−04 | 0.321802E−05  | −0.844582E−07 | 0.894056E−09  |
| S6  | 0 | −0.677401E−04 | 0.347953E−05  | −0.934105E−07 | 0.101138E−08  |
| S12 | 0 | −0.107031E−03 | −0.128982E−05 | 0.246216E−06  | −0.131930E−07 |
| S15 | 0 | −0.129941E−03 | 0.344852E−05  | −0.253970E−06 | 0.114604E−07  |

In the Table 1 (same as later described Table 2 and Table 3), the surface numbers S1 to S24 designates an entrance face and an exit face of light at a central axis of the lenses L1 to L10, the prism P1, the iris IR, the filter FL, and the cover glass CG from the object side in this order. For example, S1 designates an object side lens surface, and S2 designates a lens surface at the image plane IMG side thereof. Further, S3 designates a surface of an object side of the prism P1, and S4 designates a surface of the image plane IMG side thereof. And as for the cemented lens, the cemented surfaces are designated with the same surface number. For example, S10 designates a cemented surface of the lens L4 and the lens L5.

Further, R is a curvature of respective surface, d is a space between surfaces, ne is a refraction index to the e-line, and ve is an Abbe's number based on the e-line, respectively. In the column of the curvature R, a surface designated as (ASP) following the numeric value designates that the surface is configured with an aspheric surface. Further, the space d designates a space between the surface and a surface positioned adjacent to the image plane IMG side. For example, the value for the space d written in the column for the surface number S1 designates the thickness between the object side and the image plane IMG side of the lens L1. In addition, the space d moving during the zooming and the focusing operations is designated as the short focal length end, the intermediate focal length, and the long focal length end during zooming operation in this order.

Further in this first embodiment, both side surfaces (S5 and S6) of the lens L2, the object side surface (S12) of the lens L6, and the object side surface (S15) of the lens L7 are configured with aspheric surfaces, respectively. The shape of the aspheric surface is expressed by following equation (8).

$$x = \frac{y^2/r}{1+(1-\kappa \cdot y^2/r^2)^{1/2}} + C4 \cdot y^4 + C6 \cdot y^6 + C8 \cdot y^8 + C10 \cdot y^{10} \quad (8)$$

In this case, a distance from an apex of each lens surface in the optical axis direction is x, a radius of curvature is r, and a conic constant is κ. Further, a fourth order, a sixth order, an eighth order and a tenth order aspheric surface coefficients are C4, C6, C8, and C10, respectively, and Table 3 (same as later described Table 6 and Table 9) designates values of these aspheric surface coefficients. In addition, a character "E" in Table 3 (same as later described Table 6 and Table 9) means an exponential notation to base 10.

As like the first embodiment, by configuring at least one of lens surfaces of the lens included in the first lens group GR1 with an aspheric surface, it is possible to correct the distortion and to miniaturize the prism P1 by making the effective diameter of the lens L1 small. Further in the fifth lens group GR5, the cemented surface (S19) of the lens L9 and the lens L10 is configured to be a convex shape toward the object side, so that it is possible to correct a chromatic aberration and to reduce a sensitivity of the fifth lens group GR5 with respect to the deterioration of the lens performance. By using of the cemented lens, it is possible to avoid a slant of the image plane by the decentering within the lens group, to reduce the amount of emergence of the coma aberration, and also to make the manufacture easy.

FIG. 2A to FIG. 4C are various aberration charts at the short focal length end, the intermediate focal length, and the long focal length end, respectively.

In this case, each chart A of the charts designates a spherical aberration, wherein a vertical axis is a ratio with the F-number when the shutter is opened, and a horizontal axis is a focus amount. Further, in the charts of the spherical aberrations, a solid line designates an e-line (a wavelength of 546.1 nm), a dotted line designates a g-line (at wavelength of 435.8 nm), and a one dot chain line designates a C-line (a wavelength of 656.3 nm), respectively. Further, each chart B of the charts designates an astigmatism, wherein a vertical axis is an image height, and a horizontal axis is a focus amount, and further a solid line designates values in the sagittal image surface, and a dotted line designates values in a meridional image surface. Further, each chart C the charts designates a distortion, wherein a vertical axis is an image height, and a horizontal axis is a ratio (%) (These are the same in later described FIG. 5A to FIG. 10C.)

Next, the second embodiment is described. Table 4 shows each of numeric values in the second embodiment. Table 5 shows each value of a focal length f, an F-number (FNo.), and a half field angle ω at each focal point in the second embodiment. Further, Table 6 shows an aspheric surface coefficient of a surface formed as an aspheric surface in the second embodiment.

TABLE 4

| | SURFACE NO. | R | d | ne | ve |
|---|---|---|---|---|---|
| L1 | S1 | 49.222 | 0.65 | 1.93323 | 20.7 |
|    | S2 | 8.859  | 1.4  |         |      |
| P1 | S3 | Infinity | 7.0 | 1.83962 | 42.8 |
|    | S4 | Infinity | 0.3 |         |      |
| L2 | S5 | 12.463(ASP)  | 2.264 | 1.77173 | 49.0 |
|    | S6 | −15.463(ASP) | 0.5 to 3.578 to 5.834 |  |  |
| L3 | S7 | 93.939 | 0.5   | 1.83962 | 42.8 |
|    | S8 | 6.932  | 0.915 |         |      |

TABLE 4-continued

| | SURFACE NO. | R | d | ne | ve |
|---|---|---|---|---|---|
| L4 | S9 | −11.581 | 0.45 | 1.80831 | 46.3 |
| L5 | S10 | 8.172 | 0.954 | 1.933323 | 20.7 |
| | S11 | 38.779 | 5.834 to 2.756 to 0.5 | | |
| L6 | S12 | 11.685(ASP) | 1.485 | 1.81081 | 40.5 |
| | S13 | −63.377(ASP) | 1.0 | | |
| IR | S14 | — | 6.78 to 4.52 to 1.095 | — | — |
| L7 | S15 | 11.903(ASP) | 2.275 | 1.58547 | 59.2 |
| L8 | S16 | −6.157 | 0.6 | 1.81263 | 25.3 |
| | S17 | −11.138 | 1.642 to 3.901 to 6.326 | | |
| L9 | S18 | 72.313 | 0.5 | 1.81184 | 33.0 |
| L10 | S19 | 4.8 | 2.416 | 1.48914 | 70.2 |
| | S20 | −64.888 | 7.709 | | |
| FL | S21 | Infinity | 1.7 | 1.51872 | 64.0 |
| | S22 | Infinity | 1.12 | | |
| CG | S23 | Infinity | 0.5 | 1.51872 | 64.0 |
| | S24 | Infinity | 0.99 | | |
| — | IMG | Infinity | — | — | — |

TABLE 5

| | SHORT FOCAL LENGTH END | INTERMEDIATE FOCAL LENGTH | LONG FOCAL LENGTH END |
|---|---|---|---|
| f | 6.90 | 11.61 | 19.63 |
| FNo. | 3.59 | 3.84 | 4.40 |
| ω | 29.96° | 17.88° | 10.68° |

TABLE 6

| SURFACE NO. | k | C4 | C6 | C8 | C10 |
|---|---|---|---|---|---|
| S5 | 0 | −0.134225E−03 | 0.727265E−05 | −0.533224E−06 | 0.125773E−07 |
| S6 | 0 | 0.138865E−04 | 0.789051E−05 | −0.573209E−06 | 0.141278E−08 |
| S12 | 0 | −0.198678E−03 | 0.346214E−05 | −0.777197E−06 | 0.681143E−07 |
| S13 | 0 | −0.179486E−04 | 0.374716E−05 | −0.616608E−06 | 0.541316E−07 |
| S15 | 0 | −0.235604E−03 | 0.607670E−05 | −0.530289E−06 | 0.254700E−07 |

In this second embodiment, the both side surfaces (S5 and S6) of the lens L2, the both side surfaces (S12 and S13) of the lens L6, and the object side surface (S15) of the lens L7 are configured with aspheric surfaces, respectively.

In the above second embodiment, similar to the first embodiment, both side surfaces (S5 and S6) of the lens L2 of the first lens group GR1 are configured to be aspheric surfaces, so the distortion is corrected, and the prism P1 is miniaturized. In addition, the cemented surface of the cemented lens (lens L9 and lens L10) used in the fifth lens group GR5 is configured to be a convex shape toward the object side, and the chromatic aberration is corrected.

FIG. 5A to FIG. 7C are various aberration charts at a short focal length end, an intermediate focal length, and a long focal length end, respectively. At each chart, each chart A designates a spherical aberration, a chart B designates an astigmatism, and a chart C designates a distortion.

Next, a third embodiment is described. Table 7 shows each of numeric values in the third embodiment. Further, the Table 8 shows each value of a focal length f, an F-number (FNo.), and a half field angle ω at respective focal point. Further, the Table 9 shows an aspheric surface coefficient formed as an aspheric surface in the third embodiment.

TABLE 7

| | SURFACE NO. | R | d | ne | ve |
|---|---|---|---|---|---|
| L1 | S1 | 28.725 | 0.65 | 1.93323 | 20.7 |
| | S2 | 10.45 | 3.2 | | |
| P1 | S3 | Infinity | 12.0 | 1.83962 | 42.8 |
| | S4 | Infinity | 0.2 | | |
| L2 | S5 | 20.223(ASP) | 2.64 | 1.77173 | 49.0 |
| | S6 | −27.544(ASP) | 0.5 to 7.015 to 11.158 | | |
| L3 | S7 | 37.88 | 0.5 | 1.83962 | 42.8 |
| | S8 | 8.254 | 1.297 | | |
| L4 | S9 | −27.322 | 0.45 | 1.83962 | 42.8 |
| L5 | S10 | 6.776 | 1.311 | 1.933323 | 20.7 |
| | S11 | 22.802 | 11.158 to 4.643 to 0.5 | | |
| L6 | S12 | 10.412(ASP) | 1.36 | 1.81081 | 40.5 |
| | S13 | 43.368 | 1.0 | | |
| IR | S14 | — | 7.573 to 5.208 to 2.226 | — | — |
| L7 | S15 | 10.051(ASP) | 2.365 | 1.58547 | 59.2 |
| L8 | S16 | −6.286 | 0.6 | 1.93323 | 20.7 |
| | S17 | −10.598 | 1.0 to 3.365 to 6.457 | | |
| L9 | S18 | 17.9801 | 0.5 | 1.83930 | 37.1 |
| L10 | S19 | 4.75 | 2.554 | 1.48914 | 70.2 |
| | S20 | 1.4856(ASP) | 6.53 | | |
| FL | S21 | Infinity | 1.0 | 1.51872 | 64.0 |
| | S22 | Infinity | 1.12 | | |

TABLE 7-continued

| | SURFACE NO. | R | d | ne | ve |
|---|---|---|---|---|---|
| CG | S23 | Infinity | 0.5 | 1.51872 | 64.0 |
| | S24 | Infinity | 0.99 | | |
| — | IMG | Infinity | — | — | — |

TABLE 8

| | SHORT FOCAL LENGTH END | INTERMEDIATE FOCAL LENGTH | LONG FOCAL LENGTH END |
|---|---|---|---|
| f | 5.15 | 9.99 | 19.36 |
| FNo. | 3.57 | 3.79 | 4.49 |
| ω | 37.77° | 20.62° | 10.77° |

TABLE 9

| SURFACE NO. | k | C4 | C6 | C8 | C10 |
|---|---|---|---|---|---|
| S5  | 0 | −0.801729E−04 | 0.357209E−05  | −0.107727E−06 | 0.133399E−08 |
| S6  | 0 | −0.647810E−04 | 0.373831E−05  | −0.113764E−06 | 0.143294E−08 |
| S12 | 0 | −0.123463E−03 | −0.407832E−05 | 0.524971E−06  | −0.256521E−07 |
| S15 | 0 | −0.297923E−03 | 0.516751E−05  | −0.501906E−06 | 0.229718E−07 |
| S20 | 0 | 0.178451E−03  | 0.386156E−04  | −0.504340E−06 | 0.250770E−06 |

In this third embodiment, the both side surfaces (S5 and S6) of the lens L2, the object side surface (S12) of the lens L6, the object side surface (S15) of the lens L7, and the image plane IMG side surface (S20) of the lens L10 are configured respectively by an aspheric surface.

In the above mentioned third embodiment, similar to the first embodiment, both side surfaces (S5 and S6) of the lens L2 in the first lens group GR1 are configured to be aspheric surfaces, the distortion is corrected, and the prism P1 is miniaturized. In addition, the cemented surface of the cemented lens (lens L9 and lens L10) used in the fifth lens group GR5 is configured to be a convex shape towards the object side, and the chromatic aberration is corrected. In addition, the image plane IMG side surface of the lens L10 is configured with an aspheric surface. As described above, it is possible to effectively correct the astigmatism, and to shorten the total length of the lens system by configuring the at least one of lens surfaces of lenses included in the fifth lens group GR5 with an aspheric surface.

FIG. 8A to FIG. 10C are various aberration charts at a short focal length end, an intermediate focal length, and a long focal length end, respectively. At each chart, a chart A designates a spherical aberration, a chart B designates an astigmatism, and a chart C designates a distortion.

In a Table 10, numeric values for finding conditions at each of equations (4) to (7) in the first, second, and third embodiments are shown.

TABLE 10

|  | FIRST EMBODIMENT | SECOND EMBODIMENT | THIRD EMBODIMENT |
|---|---|---|---|
| Eg. (4): β 5 | 1.34 | 1.62 | 1.61 |
| Eg. (5): |dZ2/dZ4| | 1.42 | 1.14 | 1.95 |
| Eg. (6): neL1 | 1.93323 | 1.93323 | 1.93323 |
| Eg. (7): veL1 | 20.7 | 20.7 | 20.7 |

As shown in the Table 10, the above-mentioned first to third embodiments satisfy each condition of the equations (4) to (7). Further as apparent form the various aberration charts in FIG. 2A to FIG. 10C, it is clear that various aberrations are corrected with good balances at the short focal length end, the intermediate focal length, and the long focal length end in each of embodiments. Accordingly, a preferable zoom lens is realized as a zoom lens for an imaging apparatus having a zoom factor of around 3 to 4 times, and particularly for a zoom lens for a digital still camera having a larger number of pixels.

Figure 11:
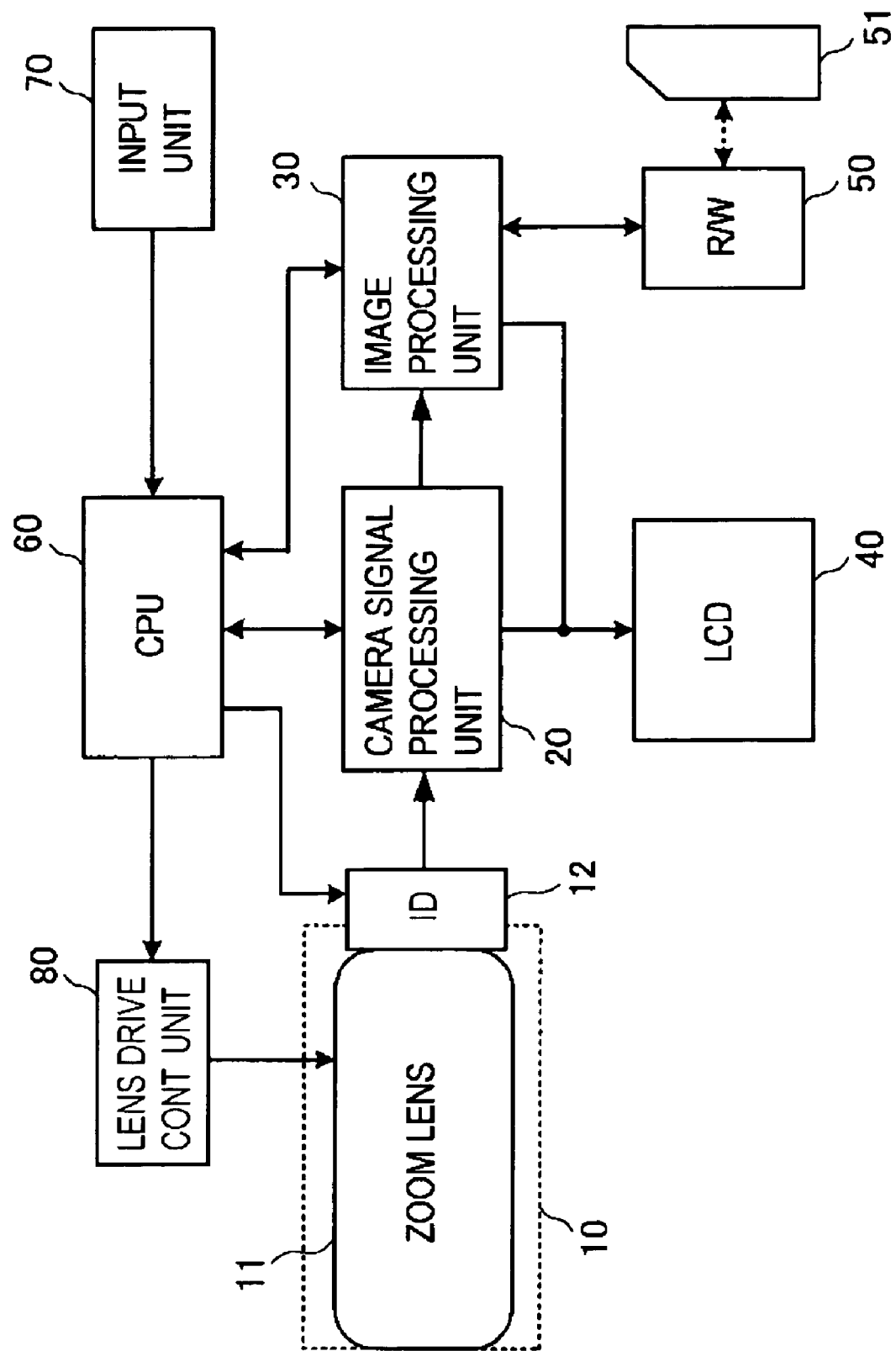
FIG. 11 is a block diagram of a configuration example of a digital still camera to which a zoom lens of the present invention is able to be mounted.

Next, an example of the imaging apparatus employing the above mentioned zoom lens is described. FIG. 11 is a block diagram showing a configuration example of a digital still camera capable of mounting the zoom lens of the present invention.

The digital still camera in FIG. 11 includes a camera block 10 having an imaging function, a camera signal processing unit 20 for carrying out signal processing such as an analog-digital conversion and the like for the captured image signal, an image processing unit 30 for carrying out processing for record/reproducing, an LCD (Liquid Crystal Display) 40 for displaying the captured image signal, that is, a taken image or the like, an R/W (Reader/Writer) 50 for reading out from and writing in to the memory card 51, a CPU 60 for controlling the whole digital still camera, an input unit 70 for input operation by a user, and a lens drive control unit 80 for controlling a drive of lenses within the camera block 10.

The camera block 10 is configured with an optical system including a zoom lens 11 to which the present invention is applied, an imaging device 12 such as CCD and the like. The camera signal processing unit 20 carries out a signal processing such as a digital signal conversion of the output signal from the imaging device 12, a noise elimination, an image quality correction, a conversion to a luminance signal and a color difference signal, and the like. The image processing unit 30 carries out the compression coding and expansion decoding processing of the image signal, and conversion processing for the data specification such as resolution and the like on the basis of the predetermined image data format.

The memory card 51 is a detachable semiconductor memory. The R/W 50 writes the image data encoded by the image processing unit 30 into the memory card 51, and reads out the stored image data from the memory card 51. The CPU 60 is a control processing unit to control each of circuit blocks within the digital still camera, and controls the each of circuit blocks in response to a command input signal from the input unit 70 or the like.

The input unit 70 is configured with, for example, a shutter release button for a shutter operation, and a selection switch for selecting operation modes and the like, and supplies a command input signal in accordance with the operation by a user to the CPU 60. The lens drive control unit 80 controls a motor or the like (not shown) for controlling a lens within the zoom lens 11 in response to the control signal from the CPU 60.

The operation of the digital still camera is briefly described as follows.

In a standby condition for taking an image, the image signal imaged by the camera block 10 is supplied to the LCD 40 by way of the camera signal processing unit 20, under the control of the CPU 60, and is displayed as a camera-through image. Further, when the command input signal for a zooming operation is entered from the input unit 70, the CPU 60 outputs a control signal to the lens drive control unit 80, and a predetermined lens within the zoom lens 11 is moved based on the control by the lens drive control unit 80.

In addition, when a not shown shutter of the camera block 10 is depressed in response to the command input signal from the input unit 70, the picked-up image signal is supplied from the camera signal processing unit 20 to the image processing unit 30 so as to be subjected to a compressed coding processing, and is converted into digital data of a predetermined data format. Thus the converted data is outputted to the R/W 50, and is written into the memory card 51.

The focusing operation is carried out, for example, when the shutter release button is half-depressed or full-depressed for writing operation, by moving a predetermined lens within the zoom lens 11 by the lens drive control unit 80 in response to the control signal from the CPU 60.

Further, in case of reproducing the image data recorded in the memory card 51, a predetermined image data is read out from the memory card 51 by the R/W 50 in response to the operation in the input unit 70, and after being performed an expansion decoding processing, the reproduced image signal is outputted to the LCD 40. Thus, the reproduced image signal is displayed.

Figure 12:
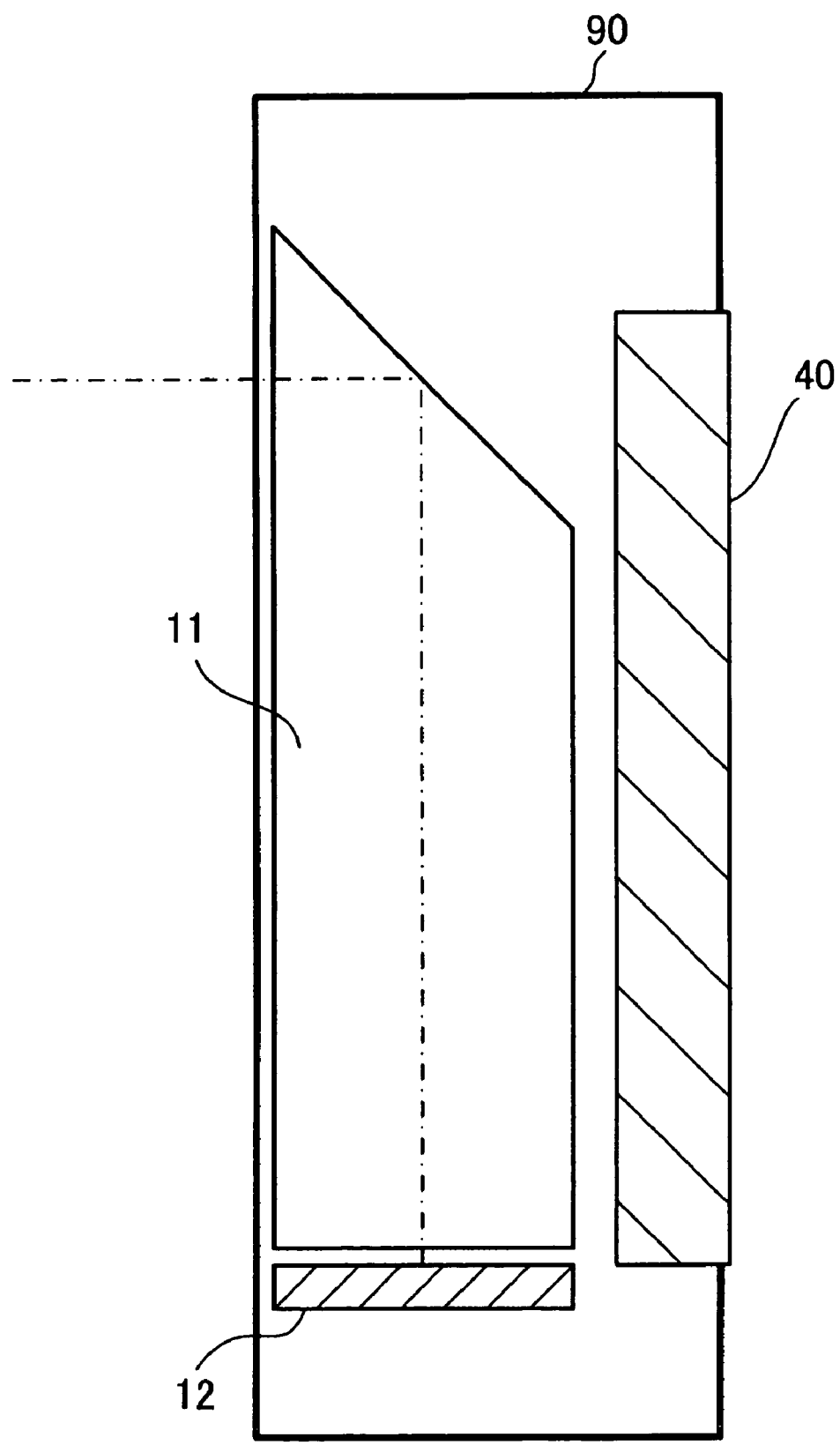
FIG. 12 is a sectional view of a mounting structure of components in a digital still camera in an embodiment of the present invention.

FIG. 12 is a sectional view showing an assembled structure of parts in the digital still camera. In FIG. 12, an inside of the digital still camera is shown in a case where an object exists at left side in the drawing. The zoom lens 11 is accommodated inside of the camera body 90, and the imaging device 12 is provided lower side thereof. Further, the LCD 40 is provided at the camera body 90 side opposing to the object, and is used to adjust an image angle.

The zoom lens of the present invention is so configured to be able to carry out zooming and focusing operations by bending an optical axis of a light from an object with a prism, and further by moving a predetermined lens along with the direction (up-down direction in the figure) of the bent optical axis. Accordingly, it is possible to carry out the imaging without projecting the zoom lens 11 from the camera body 90, and to shorten the horizontal depth of the camera body during taking the image. In addition to this, the zoom lens 11 is designed to satisfy with the above mentioned conditions, so that a further slim design and a miniaturization in the up-down direction of the camera body 90 become possible. Even though the camera is compact, it is possible to perform zooming operation around 3 to 5 times, and further it is possible to obtain a high quality taking image having less aberration at every focal lengths.

Further, in the above embodiment, it is described a case where the zoom lens of the present invention is applied to a digital still camera, but it is possible to apply to other imaging apparatus such as a video camera and the like.

As described above, the zoom lens of the present invention includes five lens groups having refraction powers of positive, negative, positive, positive, and negative from an object side in this order. It is possible to perform the zooming operation by moving the second and fourth lens groups among them. Further, the first lens group includes a front-side lens group having an negative refracting power, an optical element for folding an optical path, and a backside lens group having a positive refracting power from the object side in this order, and the movable direction of the second and fourth lens groups during the zooming operation becomes an optical axis direction of the backside lens group in the first lens group, so it is possible to perform a slim design for the lens system. In addition, by increasing the imaging magnification $\beta 5$ of the fifth lens group larger than 1.3 where an object distance is at infinity, it is possible to shorten the focal length of the lens groups positioned relatively closer to the object side, and is possible not only to shorten the total length of the lens system but also to make smaller an effective diameter of the front-side lens group and backside lens group of the first lens group. However, if the imaging magnification $\beta 5$ of the fifth lens group is made larger than 2.2, it is difficult to carry out an adequate correction of the spherical aberration when reducing the F-number, and the imaging performance to the image plane deteriorates. Accordingly, by satisfying the above mentioned conditions of the fifth lens group to the imaging magnification $\beta 5$, it is possible to miniaturize the optical element in the first lens group and to thin the total lens system, while maintaining better optical performance.

The invention claimed is:

1. A zoom lens comprising:
   a first lens group having a positive refracting power;
   a second lens group having a negative refracting power;
   a third lens group having a positive refracting power;
   a fourth lens group having a positive refracting power; and
   a fifth lens group having a negative refracting power, from an object side in this order, wherein a zooming operation is carried out by moving the second lens group and the fourth lens group;
   wherein the first lens group comprises:
   a front-side lens group having a negative refracting power;
   an optical element for folding an optical path; and
   a backside lens group having a positive refracting power, from the object side in this order; and
   wherein a condition of $1.3<\beta 5<2.2$ is satisfied, provided that an imaging magnification of the fifth lens group at a position where an object distance is at infinity is $\beta 5$.

2. The zoom lens as cited in claim 1, wherein the zooming operation from a wide-end side to a tele-end side is carried out by moving the second lens group from the object side to the image plane side and by moving the fourth lens group from the image plane side to the object side.

3. The zoom lens as cited in claim 2, wherein a condition of $0.85<|dZ2/dZ4|<2.2$ is satisfied, provided that a stroke of the second lens group from a short focal length end to a long focal length end is dZ2, and a stroke of the fourth lens group from the short focal length end to the long focal length end at a position where an object distance is at infinity is dZ4.

4. The zoom lens as cited in claim 1, wherein at least one of surfaces of lens included in the first lens group is configured to be an aspheric surface.

5. The zoom lens as cited in claim 1, wherein the fifth lens group comprises a cemented lens having a cemented surface in which a surface opposed to the object side is configured to be a convex surface.

6. The zoom lens as cited in claim 1, wherein at least one of surfaces of lens included in the fifth lens group is configured to be an aspheric surface.

7. The zoom lens as cited in claim 1, wherein the front-side lens group comprises a single meniscus lens formed to be a convex shape towards the object side and having an negative refracting power; the optical element comprises a prism; and the backside lens group comprises a single lens in which both surfaces are formed to be convex shapes. Image Page 3

8. The zoom lens as cited in claim 7, wherein conditions of neL1>1.8, and veL1<30 are further satisfied, provided that a refraction index of the front-side lens group to an e-line is neL1, and an Abbe's number of the front-side lens group based on the e-line is veL1.

9. An imaging apparatus employing a zoom lens as an image-taking lens, the zoom lens comprising:
   a first lens group having a positive refracting power;
   a second lens group having a negative refracting power;
   a third lens group having a positive refracting power;

a fourth lens group having a positive refracting power; and a fifth lens group having a negative refracting power, from an object side in this order, wherein a zooming operation is carried out by moving the second lens group and the fourth lens group;

wherein the first lens group comprises:
 a front-side lens group having a negative refracting power;

an optical element for folding an optical path; and a backside lens group having a positive refracting power from the object side in this order; and wherein a condition of $1.3<\beta 5<2.2$ is satisfied, provided that an imaging magnification of the fifth lens group at a position where an object distance is at infinity is $\beta 5$.

* * * * *

UNITED STATES PATENT AND TRADEMARK OFFICE
CERTIFICATE OF CORRECTION

PATENT NO. : 7,295,380 B2
APPLICATION NO. : 10/558064
DATED : November 13, 2007
INVENTOR(S) : Masafumi Sueyoshi It is certified that error appears in the above-identified patent and that said Letters Patent is hereby corrected as shown below:

Column 6, lines 34 and 35, delete "L5" from line 34 and insert --L5-- to line 35; and Column 14, line 57, delete "Image Page 3."

Signed and Sealed this

Eighth Day of July, 2008

JON W. DUDAS
*Director of the United States Patent and Trademark Office*